May 26, 1964
O. M. STUETZER
3,134,563
ICE WARNING DEVICE
Filed Sept. 24, 1962
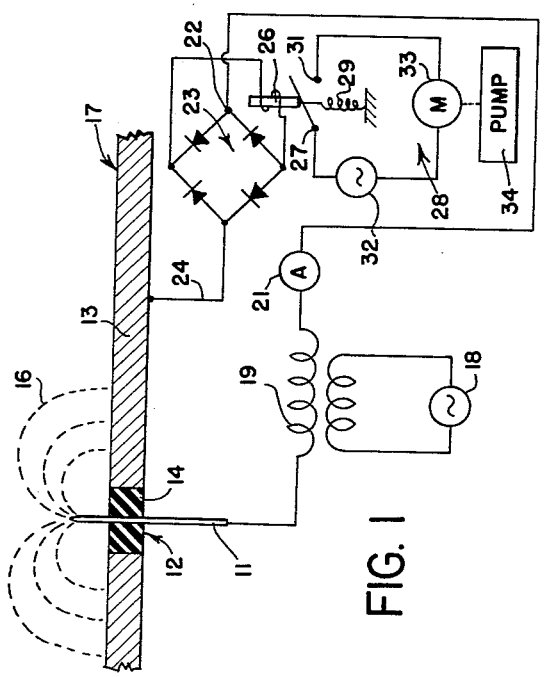
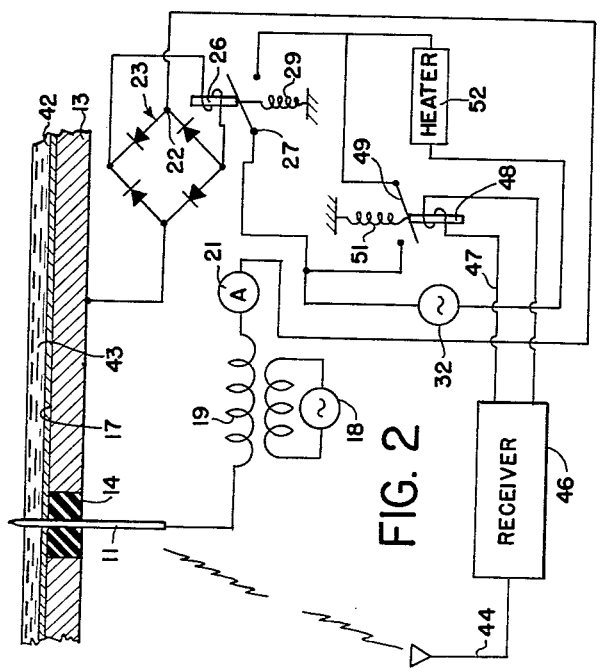
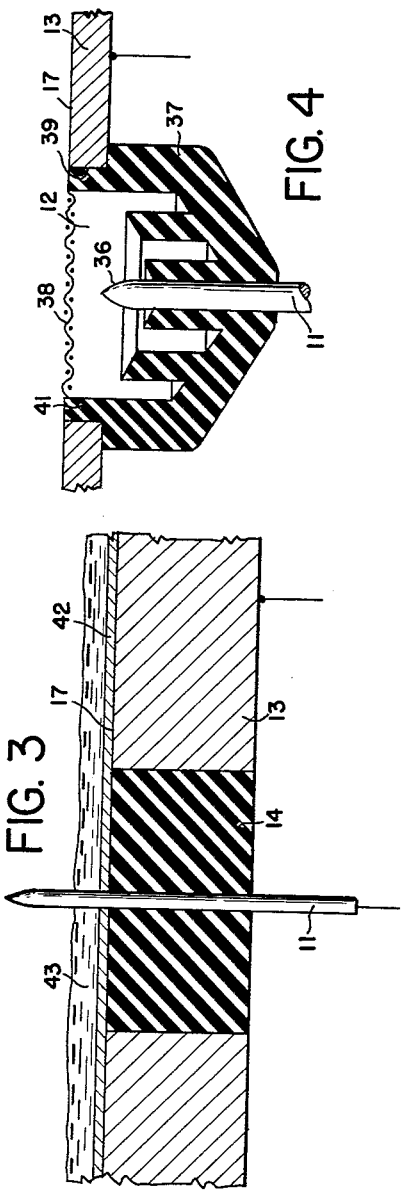
INVENTOR.
OTMAR M. STUETZER
BY Harold D. Jackson
ATTORNEY

United States Patent Office 3,134,563
Patented May 26, 1964

3,134,563
ICE WARNING DEVICE
Otmar M. Stuetzer, Hopkins, Minn., assignor, by mesne assignments, to Litton Systems, Inc., Beverly Hills, Calif., a corporation of Maryland
Filed Sept. 24, 1962, Ser. No. 225,764
8 Claims. (Cl. 244—134)

This invention relates to snow, ice and sleet sensing devices, and more particularly to an apparatus for detecting the presence of snow, ice, or sleet on an exposed structure or airfoil and for controlling a heater or other removal device to remove the accumulated snow, ice, or sleet from the structure or airfoil.

Snow, ice, or sleet, often accumulates on the airfoil or wing surfaces of aircraft thus reducing the lift provided the aircraft by the airfoil involved. Often this reduction of lift will result in an accident or at a very minimum will result in a need for greater power. Also, the wider use of helicopters for a variety of flying problems has resulted in the need to consider ice accumulation problems on the propellers of the helicopters. Like the airfoils or wings of the conventional aircraft, the propellers of the helicopter collect snow, ice, and sleet. Thick layers of snow, ice, or sleet, will alter the airfoil of the helicopter propeller to the extent that the propellers are no longer able to maintain the helicopter in flight. The amount of snow, ice, or sleet, necessary to destroy the lifting characteristics of the helicopter propeller is very small, consequently, a device is needed which can rapidly detect even small accumulations so that proper counter measures can be taken to eliminate the snow, ice, or sleet, from the propellers. There are also sensitive instrument payloads on aircraft, balloons, and ships which require snow, ice, and sleet protection.

It is therefore an object of the present invention to provide a new and improved device for detecting snow, ice, and sleet accumulations on exposed structures.

Another object of the present invention is to provide a snow, ice, and sleet sensing device for controlling the operation of snow, ice, and sleet removal apparatus which is reliable in operation, simple to install, and is fail-safe in operation.

A further object of the present invention is to provide a new and improved snow, ice, or sleet sensing device which relies on corona discharge to detect accumulations on exposed structures and airfoils.

A further object of the present invention is to provide a new and improved snow, ice, or sleet sensing device for controlling removal equipment such as heaters and which relies on corona discharge to detect accumulations on the exposed structures and airfoils by responding to reductions of current or reduction of electromagnetic radiation due to termination of corona discharge as a result of accumulated snow, ice, or sleet.

A complete understanding of the invention may be obtained from the following detailed description of a device forming specific embodiments, when read in conjunction with the drawings, in which:

FIGURE 1 is a schematic diagram showing a corona detection system with circuitry for actuating a removal apparatus, FIGURE 2 is an alternate embodiment of the device shown in FIGURE 1 with an added sensing member for detecting termination of corona discharge, FIGURE 3 is an enlarged fragmentary view of the mounted corona point used in FIGURES 1 and 2 and showing a layer of ice accumulated on the surface of an airfoil, and FIGURE 4 is an alternate embodiment of FIGURE 3 showing a different manner for mounting a corona point in an aperture.

Refer first to FIGURE 1 of the drawings. An electrode 11 is mounted within an aperture 12 of a structure, airfoil or electrode 13 which may be the airfoil of a helicopter propeller or the wing of a conventional aircraft. The electrode or corona point 11 is mounted within the aperture 12 in an insulator 14. Insulator 14 provides electrical insulation between the corona point 11 and the airfoil 13 so that current will not leak from the point 11 to the airfoil 13. Leakage through the insulator 14 would result in an erroneous reading by the circuitry involved since the circuitry in this embodiment relies on the current set up by the corona discharge 16 to detect the presence of ice on the surface 17 of the airfoil 13.

A voltage source 18 is utilized to apply a potential to the corona point 11. The potential applied to the corona point 11 is sufficiently high to provide the corona discharge 16 necessary for the operation of the system. The source 18 is shown as an A.C. source, however a D.C. source might be used provided adequately high voltages can be attained on the tip of the corona point 11 to provide satisfactory corona discharge. In FIGURE 1 the voltage developed by the A.C. generator 18 is applied to the corona point 11 by a transformer 19. Transformer 19 increases the voltage on the corona point 11 so that satisfactory corona discharge will occur when no snow, ice, or sleet is deposited on the surface 17 of the airfoil 13.

Transformer 19 is also connected through an ammeter 21 to one terminal 22 of bridge circuit 23. Ammeter 21 is placed in the transformer and corona point circuit to give an indication of the current flow in the circuit. This ammeter may be mounted in the cockpit of an aircraft for instance so that the pilot may at all times read the magnitude of the current flowing in the system as a result of corona discharge 16 between the corona point 11 and the airfoil 13. Current flow in the system of course indicates that no ice, snow, or sleet has accumulated on the airfoil surface 17 and consequently no removal measures are needed to protect the aircraft or other structures which may be involved. Accumulation of snow, ice or sleet on th electrodes 11 and 13 reduces the mobility of the corona ions and reduces or eliminates the current flow. If the face of the ammeter is properly calibrated it could be used to measure ice thickness.

The system also includes the bridge system 23, however, so that additional actuating mechanisms may be utilized to control heating or ice removing equipment. The other side of bridge 23 is connected to lead 24 which in turn is connected to the airfoil 13 or other structure thus completing the electrical circuit for the corona discharge 16. The bridge 23 is utilized to provide direct current for controlling the operation of solenoid 26. If an A.C. source 18 is not used to energize the corona point 11, but rather a D.C. source is utilized, then the rectifying bridge circuit 23 may not be necessary to provide satisfactory potential for operation of the solenoid 26. With the A.C. current, however, the bridge circuit 23 rectifies the A.C. current flowing in the system to prevent chatter of the solenoid 26 when current is flowing in the system.

Solenoid 26 is designed to operate a switch 27 which maintains the controlled system 27 in an open or unactuated condition as long as current is flowing in the corona discharge circuit. The switch 27 is biased by a spring 29 which opposes the operation of the solenoid 26. Thus, when current ceases to flow in the corona discharge system as a result of accumulations of ice, snow, or sleet on the surface 17 of the airfoil, the solenoid 26 is deenergized. The deenergized solenoid 26 then releases the switch 27 and the spring 29 closes the switch 27 across contact 31 to complete an electrical circuit 28. As noted, the electrical circuit 28 is a control system for removal equipment. FIGURE 1 shows an A.C. source 32 which operates a motor 33. Motor 33 in turn operates a pump designed to pump air into inflatable shoes which are convenionally used to remove ice from aircraft wings and the like.

Thus it can be seen that when ice, snow, or sleet collects or accumulates on the surface 17 of an airfoil 13, the accumulated layer reduces the corona discharge 16 from the corona point 11 or completely eliminates the discharge. Reduction of this corona discharge effectively produces an open circuit so that no current will flow through the bridge 23 and to the solenoid 26. The solenoid 26 releases the switch 27 and actuates ice, snow, or sleet removal equipment to prevent loss of the airfoil characteristics of the apparatus involved. It should be noted at this point that the device shown in FIGURE 1 as will be noted with the device in FIGURE 2 is fail safe. For instance, in the event that any of the components in the circuitry for measuring the accumulation of ice, snow, or sleet should fail, the switch 27 will close and operate removal equipment even though it may not be necessary. This fail safe feature, however, is a safety measure which protects the aircraft from faulty equipment or failure of the sensing circuitry.

Since the corona point 11 is ideally a rather small shaft of material with a small point 36, it is often necessary to take measures to protect the corona point 11 from damage which may result if it protrudes through the aperture 14 and extends beyond the surface 17 of the airfoil 13. FIGURE 4 shows a structure for protecting the corona point 11. An insulator 37 is mounted within the aperture 12 so that the corona point 11 may be recessed within the body of the airfoil 13. In this position the corona point 11 is not exposed above the surface 17 of the airfoil and is not subject to damage which may occur as a result of maintenance operation of flying operation. In order to further protect the corona point 11, a grid 38 is placed over the aperture 12. This grid may be composed of any material such as fiber glass or the like. It must, however, be a material which does not interfere with the normal corona discharge which is necessary for the operation of the system. The insulator 37 is mounted within the aperture 12 so that corona discharge does not occur between the tip 36 and the inside wall 39 of the aperture 12. Any discharge through this path may result in inaccurate indications since the ice, sleet, or snow may collect on surface 17 without a similar accumulation on surface 39 of the airfoil 13. Consequently, the insulator 37 is extended into the aperture 12 so that extension 41 covers the inside surface 39 of the aperture 12.

The previously described circuit will operate under two different conditions. In the first place the solenoid 26 will release the switch 27 when a complete termination of the corona discharge 16 takes place and eliminates the current flow in the test system. On the other hand, however, the solenoid 26 and bias string 29 may be adjusted by well known means so that a simple reduction in the current flow as a result of reduced corona discharge will also result in closure of the switch 27 to activate the control system 28. A solenoid 26, spring 29, or other conventional circuitry for operation of the control system 28 as a result of a mere reduction of current flow in the testing system may be necessary since it is highly likely that some current will flow in the system as a result of stray resistance currents or as a result of contamination which may close an electrical circuit between the surface 17 and the corona point 11.

An example of how a leakage current may develop and produce a current flow in the testing system with no corona discharge is illustrated in FIGURE 3. The corona point 11 is insulated from the airfoil 13 by an insulator 14. However, due to contamination which may occur in the air, a layer of material 42 may be formed over the surface 17 of the airfoil 13. Formation of a layer of ice 43 will result in a termination of a corona discharge and consequently will result in a termination of current flow in the electrical system as a result of corona discharge. However, the contamination 42 has now closed an electrical circuit between the airfoil 13 and the corona point 11 over the insulator 14. When this contamination 42 is present, the current flow is from the corona point 11 through the contamination layer 42, which overlaps the insulator 14, and then through the airfoil 13. Normally this stray current produced by the contamination is somewhat less than the current generated as a result of corona discharge. The contamination problem may be avoided by simply using circuits such as adjustable solenoids 26 and adjustable bi-springs 29 which will respond to a reduction of current which results when a corona discharge terminates.

A more satisfactory method of eliminating the problem of the contamination 42 in the detection device is illustrated in FIGURE 2 of the drawings. It is well known that electromagnetic radiation is generated when corona discharge is occurring. The frequency of this noise type electromagnetic radiation generated by the corona discharge is within a fairly well defined band of frequencies. On the other hand, the current which flows through the system as a result of contamination 42 which interconnects the corona point 11 and the airfoil 13 also generates electromagnetic noise type radiation. This electromagnetic radiation, however, is of a different frequency band than that generated by the corona discharge. This frequency difference may be utilized to distinguish between the current flowing in the testing system as a result of corona discharge and the current flowing as a result of leakage current caused by contamination 42 on the surface 17 of the airfoil.

The electromagnetic radiation from the corona discharge and from the current flow through the contamination 42 is picked up by an antenna 44. This antenna is connected into receiver 46. Receiver 46 is of the conventional type. Receiver 46 has filters for removing all the frequencies which are generated as a result of a leakage current through the contamination 42, thus passing only the frequencies which are generated by the corona discharge. Receiver 46 is designed to operate only when a signal is being received and is passing through the band pass filters. When the corona discharge 16 is occurring, receiver 46 is receiving the signals through the antenna 44. Thus a current flow is occurring in line 47 which is connected to a solenoid 48. Solenoid 48 operates in a similar manner to solenoid 26. The solenoid 48 maintains switch 49 open as long as current is flowing in the circuit 47. When, however the corona discharge terminates and no signal is passing through signal 46, the current flow in the circuit 47 terminates thus deenergizing the solenoid 48. Spring 51 is tensioned and closes the switch 49 when the solenoid 48 is deenergized. Closure of switch 49 closes the circuit including the A.C. generator 32 so that the heater 52 is operated to remove ice from the surface of the airfoil 13. As previously noted this heater 52 may be an air pump or other ice removal mechanism.

Thus it can be seen that even though the contamination 42 exists on the surface 17 of the airfoil 13, and produces a current in the circuit containing solenoid 26, the frequency responsive circuit will also operate the ice, snow, or sleet removal equipment, thus providing another safety measure for positive operation of removal equipment when ice, snow, or sleet tend to accumulate on the surface of the airfoil. It should also be noted that the radiation responsive system operates simultaneously when the current sensitive system so that both systems may function to close the circuit for heater 52. If no contamination 42 occurs on the surface of the airfoil, the solenoid 26 will operate and function as previously described.

There are numerous variations which may be utilized in connection with the above described circuits. For instance, a high voltage D.C. system may be utilized to apply the potential to the corona point 11 to generate the corona point discharge rather than using the A.C. source 18 as shown in the circuits. This would eliminate the need for the rectifier 23 which provides D.C. current for the solenoid 26. The spring biased switches 27 and 49 are used for illustrative purposes only and any type of switching mechanism which will complete the electrical system for the ice removal equipment such as the heater 52 or the pump 34 may be utilized in the place of the spring bias which is shown in the drawings.

It is to be understood that the above described arrangements are simply illustrative of the application of the principles of the invention. Numerous other arrangements may be readily devised by those skilled in the art which will embody the principles of the invention and fall within the spirit and scope thereof.

Now therefore I claim:

1. A device for detecting ice, snow, and sleet accumulation on the surface of an airfoil which comprises a corona point positioned within an aperture in said airfoil, generating means for applying a voltage to said point to generate a corona discharge between said point and said airfoil, and means responsive to reductions of said corona discharge for indicating accumulations on said airfoil.

2. A device in accordance with claim 1 which further includes an insulator mounted within said aperture for securing said corona point and for insulating said point from said airfoil.

3. A device in accordance with claim 2 in which said corona point is positioned within said aperture below the surface of said airfoil and which further includes a grid in said aperture for protecting said corona point.

4. A device for detecting ice, snow, or sleet accumulation on the surface of an airfoil which comprises an electrical probe positioned near the surface of said airfoil, an electrical contact connected to said airfoil, generating means for applying a voltage to said probe to generate a corona discharge between said probe and said airfoil, and means interconnecting said contact and said generating means for responding to a reduction of said corona discharge as a result of accumulations on said airfoil.

5. A device for detecting accumulation of ice, snow, or sleet on the surface of an airfoil and for operating an ice, snow, or sleet remover which comprises an insulator mounted in an aperture in said airfoil, a corona point mounted in said insulator, generating means for applying a voltage to said corona point, means for operating said remover, and means responsive to reductions in corona discharge and interconnecting said airfoil and generating means for actuating said means for operating.

6. A device in accordance with claim 5 in which said means for actuating includes a solenoid and in which said means for operating includes a switch held open by said solenoid when no accumulation is present on said airfoil.

7. A device in accordance with claim 6 in which said generating means includes an A.C. source and in which said means for actuating includes a rectifier.

8. A device for detecting ice, snow, or sleet accumulation on the surface of an airfoil and for operating an ice, snow, or sleet remover which comprises a corona point positioned within an aperture in said airfoil; an ice, snow, or sleet removing system; generating means for applying a voltage to said point to generate a corona discharge between said point and said airfoil; current responsive means interconnecting said airfoil and said generating means for actuating said removing system in response to reductions in current flow due to reductions of corona discharge caused by accumulations on said airfoil; and means responsive to corona generated electromagnetic radiation for actuating said removing system in response to termination of said radiation.

References Cited in the file of this patent

UNITED STATES PATENTS

| | | |
|---|---|---|
| 2,206,896 | Higgins et al. | July 9, 1940 |
| 2,432,669 | Kliever | Dec. 16, 1947 |
| 2,480,846 | Friedman et al. | Sept. 6, 1949 |
| 2,557,311 | Pond | June 19, 1951 |
| 2,577,779 | Lindberg | Dec. 11, 1951 |
| 2,789,281 | Short | Apr. 16, 1957 |
| 3,035,208 | Clark | May 15, 1962 |